US012019184B2

(12) United States Patent
Vuletici et al.

(10) Patent No.: US 12,019,184 B2
(45) Date of Patent: Jun. 25, 2024

(54) HERMETICALLY-SEALED VEHICLE LIDAR ASSEMBLY

(71) Applicant: Continental Automotive Systems, Inc., Auburn Hills, MI (US)

(72) Inventors: Goran Vuletici, Santa Barbara, CA (US); Madeline Dippel, Santa Barbara, CA (US); James Robert Massie, Santa Barbara, CA (US); Chad S Wang, Santa Barbara, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 639 days.

(21) Appl. No.: 17/247,567

(22) Filed: Dec. 16, 2020

(65) Prior Publication Data

US 2022/0187425 A1   Jun. 16, 2022

(51) Int. Cl.
  *G01S 7/48*   (2006.01)
  *G01S 7/481*   (2006.01)
  *G01S 17/931*   (2020.01)

(52) U.S. Cl.
  CPC .......... *G01S 7/4813* (2013.01); *G01S 17/931* (2020.01)

(58) Field of Classification Search
  None
  See application file for complete search history.

(56) References Cited

U.S. PATENT DOCUMENTS

| 10,969,473 B2 | 4/2021 | Li |
| 2018/1595962 | 4/2018 | Ghahremani |
| 2019/0086516 A1* | 3/2019 | Zhang ................ G02B 19/0066 |
| 2020/0233090 A1 | 7/2020 | Leppin et al. |
| 2021/0190918 A1 | 6/2021 | Li |

FOREIGN PATENT DOCUMENTS

| CN | 107462895 A | 12/2017 |
| DE | 102019105703 A1 | 9/2019 |
| WO | 9219984 A1 | 11/1992 |
| WO | 2019233499 A2 | 12/2019 |

OTHER PUBLICATIONS

The International Search Report and the Written Opinion of the International Searching Authority mailed on Apr. 8, 2022 for the counterpart PCT Application No. PCT/US2021/072945.

* cited by examiner

*Primary Examiner* — Hovhannes Baghdasaryan

(57) ABSTRACT

A vehicle lidar assembly includes a casing having a front cover and a back cover connected to the front cover defining a casing cavity between the front cover and the back cover. The front cover has an attachment feature designed to directly connect to a vehicle. The back cover is supported by the front cover and has fins designed to dissipate heat. The assembly includes a laser module disposed in the casing cavity. The laser module includes a housing having a hermetically-sealed cavity. The housing includes a base that is connected to the back cover. The laser module includes a laser disposed in the hermetically-sealed cavity 30 and supported by the base.

9 Claims, 10 Drawing Sheets

HERMETICALLY-SEALED VEHICLE LIDAR ASSEMBLY

BACKGROUND

A lidar system includes a photodetector, or an array of photodetectors. Light is emitted into a field of view of the photodetector. The photodetector detects light that is reflected by an object in the field of view. For example, a flash lidar system emits pulses of light, e.g., laser light, into essentially the entire the field of view. The detection of reflected light is used to generate a 3D environmental map of the surrounding environment. The time of flight of the reflected photon detected by the photodetector is used to determine the distance of the object that reflected the light.

The lidar system may be mounted on a vehicle to detect objects in the environment surrounding the vehicle and to detect distances of those objects for environmental mapping. The output of the lidar system may be used, for example, to autonomously or semi-autonomously control operation of the vehicle, e.g., propulsion, braking, steering, etc. Specifically, the system may be a component of or in communication with an advanced driver-assistance system (ADAS) of the vehicle.

DETAILED DESCRIPTION

Figure 1:
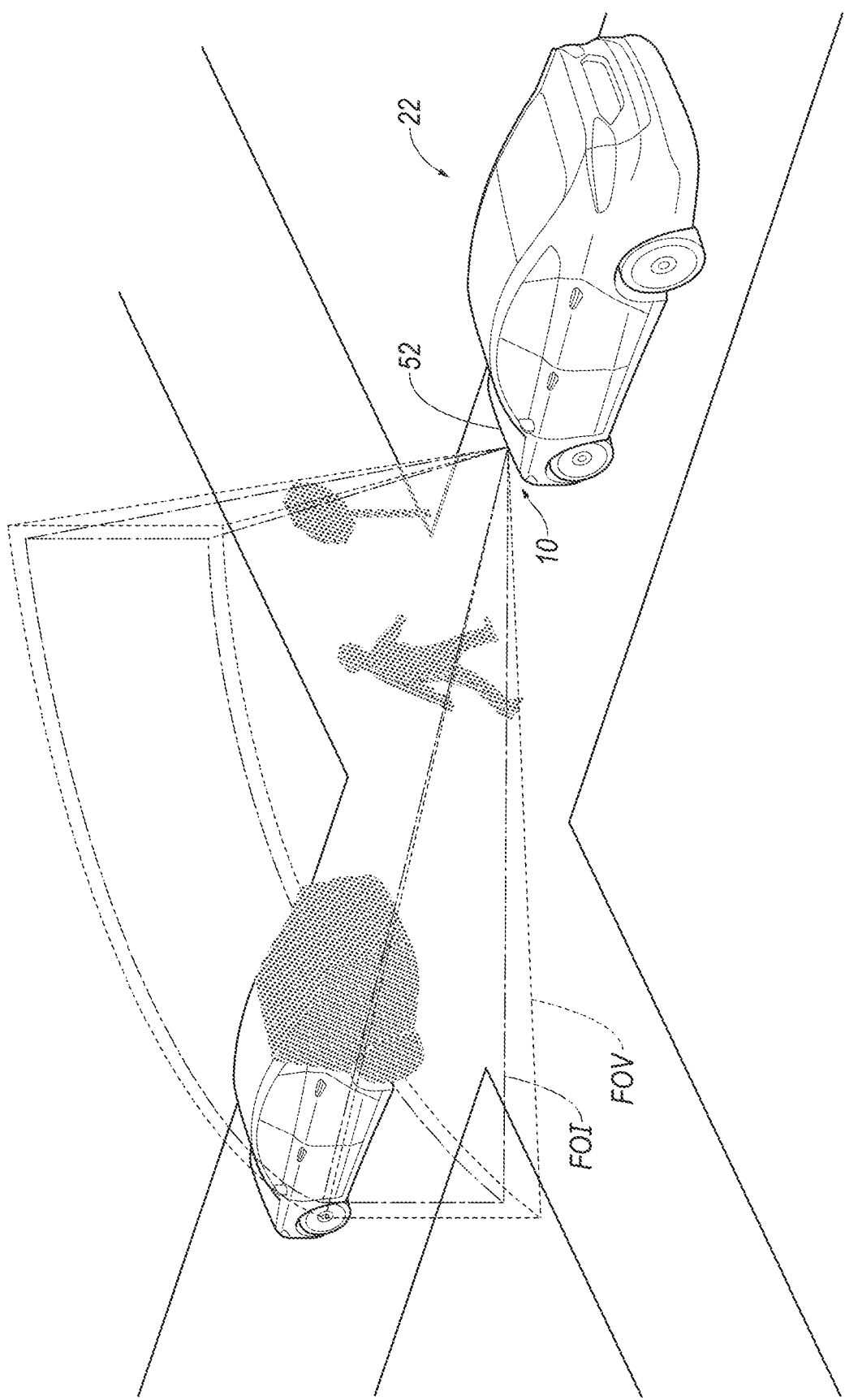
FIG. 1 is a perspective view of a vehicle having a lidar system.

With reference to the figures, where like numerals indicate like parts throughout the views, a vehicle lidar assembly 10 (hereinafter referred to as "assembly 10") is generally shown. The assembly 10 includes a casing 12 having a front cover 14 and a back cover 16 connected to the front cover 14 defining a casing cavity 18 between the front cover 14 and the back cover 16. The front cover 14 has an attachment feature 20 designed to directly connect to a vehicle 22. The back cover 16 is supported by the front cover 14 and has fins 24 designed to dissipate heat. The assembly 10 includes a laser module 26 disposed in the casing cavity 18. The laser module 26 includes a housing 28 having a hermetically-sealed cavity 30. The housing 28 includes a base 32 that is connected to the back cover 16. The laser module 26 includes a laser 34 disposed in the hermetically-sealed cavity 30 and supported by the base 32.

The attachment features 20 of the front cover 14 are used to connect the assembly 10 to the vehicle 22 and the fins 24 on the back cover 16 dissipate heat from the casing 12, e.g., dissipating heat generated by operation of the laser 34. Accordingly, the casing 12 dissipates the heat away from the casing 12 without directly transferring heat to the vehicle 22. This dissipation of heat from the casing 12 reduces or eliminates mechanical stress on the laser module 26 associated with thermal expansion and contraction, which increases the durability and longevity of the laser 34.

In some examples, as described further below, the base 32 of the housing 28 of the laser module 26 may be a copper composite, which encourages the dissipation of heat from the housing 28 to the back cover 16. As described further below, two examples of connection of the laser module 26 to the back cover 16 are shown in the figures and in these examples the base 32 of the housing 28 may be a copper composite or other suitable material. Specifically, in the example shown in FIGS. 3-5, the assembly 10 may include a bracket 36 fastened to the back cover 16 and adhesive 38 directly connecting the base 32 of the housing 28 of the laser module 26 to the bracket 36. In such an example, the bracket 36 and the adhesive 38 may reduce the material of the housing 28, e.g., copper composite, needed for heat dissipation, which may increase heat dissipation and/or reduce cost associated with the material of the housing 28. In the example shown in FIGS. 3-5, the adhesive 38 is external to the hermetically-sealed cavity 30 of the laser module 26 so that outgas from the adhesive 38, e.g., during curing of the adhesive 38, does not foul the laser 34. In the example shown in FIGS. 7-9, the housing 28 of the laser module 26 abuts the back cover 16 and is directly connected to the back cover 16 to directly dissipate heat from the housing 28 to the back cover 16. The internal components of the laser module 26 may be the same in the examples of FIGS. 3-5 and 7-9. For example, the laser module 26 shown schematically in cross-section in FIG. 6 may be used in both the example in FIGS. 3-5 and the example in FIGS. 7-9.

FIG. 1 shows an example vehicle 22. The assembly 10 is, or is a component of, a lidar system 40 of the vehicle 22. The assembly 10 is mounted to the vehicle 22. The assembly 10 is operated to detect objects in the environment surrounding the vehicle 22 and to detect distances of those objects for environmental mapping. The output of the assembly 10 may be used, for example, to autonomously or semi-autonomously control the operation of the vehicle 22, e.g., propulsion, braking, steering, etc. Specifically, the assembly 10 may be a component of or in communication with an advanced driver-assistance system (ADAS) of the vehicle 22. The assembly 10 may be mounted on the vehicle 22 in any suitable position and aimed in any suitable direction. As one example, the assembly 10 is shown on the front of the vehicle 22 and directed forward. The vehicle 22 may have more than one assembly 10 and/or the vehicle 22 may include other object detection systems, including other lidar s 40. The vehicle 22 is shown in FIG. 1 as including a single assembly 10 aimed in a forward direction merely as an example. The vehicle 22 shown in the figures is a passenger automobile. As other examples, the vehicle 22 may be of any suitable manned or un-manned type including a plane, satellite, drone, watercraft, etc.

The lidar system 40 may be a solid-state lidar system. In such an example, the assembly 10 is stationary relative to the vehicle 22. For example, the assembly 10 may include the casing 12 (shown in FIG. 2 and described below) that is fixed relative to the vehicle 22, i.e., does not move relative to the component of the vehicle 22 to which the casing 12 is attached, and a silicon substrate, e.g., a circuit board 42, of the assembly 10 may be supported by the casing 12.

As a solid-state lidar system, the lidar system 40 may be a flash lidar system. In such an example, the assembly 10 emits pulses, i.e., shots, of light into a field of illumination FOI that extends external to the assembly 10 and external to the vehicle 22. More specifically, the assembly 10 may be a 3D flash lidar system that generates a 3D environmental map of the surrounding environment, as shown in part in FIG. 1. An example of a compilation of the data into a 3D environmental map is shown in the field of view FOV and the field of illumination FOI in FIG. 1. A 3D environmental map may include location coordinates of points within the FOV with respect to a coordinate system, e.g., a Cartesian coordinate system with an origin at a predetermined location such as a GPS (Global Positioning System) reference location, or a reference point within the vehicle 22, e.g., a point where a longitudinal axis and a lateral axis of the vehicle 22 intersect.

The lidar system 40 includes a light-emitting system 44, a light-receiving system 46, and a computer 48 that controls the light-emitting system 44 and the light-receiving system 46. The assembly 10 includes the light-emitting system 44, which is housed by the casing 12. The assembly 10 is a unit including the casing 12 and the light-emitting system 44. In other words, the assembly 10 including the casing 12 and the light-emitting system 44 is mounted as one component to the vehicle 22 and may be removed as one component from the vehicle 22. As an example, the casing 12 may include one or more attachment features 20 used to attach the assembly 10 to the vehicle 22, as described further below. In addition to the casing 12 and the light-emitting system 44, the assembly 10 may include the light-receiving system 46 and/or the computer 48, i.e., the casing 12 and the light-emitting system 44 may be a unit with the light-receiving system 46 and/or the computer 48. In the alternative to light-receiving system 46 and/or the computer 48 being part of the assembly 10, the light-receiving system 46 and/or the computer 48 may be separate and disposed at different locations of the vehicle 22.

The front cover 14 and the back cover 16 are connected to each other. Specifically, the front cover 14 and the back cover 16 may be directly connected to each other, i.e., with lack of components therebetween. The front cover 14 and the back cover 16 may be sealed to each other. The front cover 14 and the back cover 16 may be connected to each other in any suitable way to prevent intrusion of environmental conditions such as dust, dirt, water, etc. For example, the front cover 14 and the back cover 16 may be adhered, bonded, welded, and/or fastened, etc., to each other. The front cover 14 and the back cover 16 define the casing cavity 18 between the front cover 14 and the back cover 16. The front cover 14 and the back cover 16 may be plastic or metal.

The casing 12 may include an outer optical fascia 50. The outer optical fascia 50 (which may be referred to as a "window") allows light to pass through. Specifically, light generated by the light emitting system exits the assembly 10 and/or light from environment enters the assembly 10. The casing 12, specifically the front cover 14, the outer optical fascia 50, and the back cover 16, protects an interior of the assembly 10 from environmental conditions such as dust, dirt, water, etc. The outer optical fascia 50 is a transparent or semi-transparent material, e.g., glass, plastic, etc. The outer optical fascia 50 may extend from the front cover 14 and/or may be attached to the front cover 14. The laser module 26 is disposed on the casing cavity 18. The outer optical fascia 50 is in the field of illumination FOI of the laser 34. Specifically, the laser 34 emits light from the laser module 26 through the optical fascia and from the casing 12 into the field of illumination FOI external to the vehicle 22, as described above.

Figure 2:
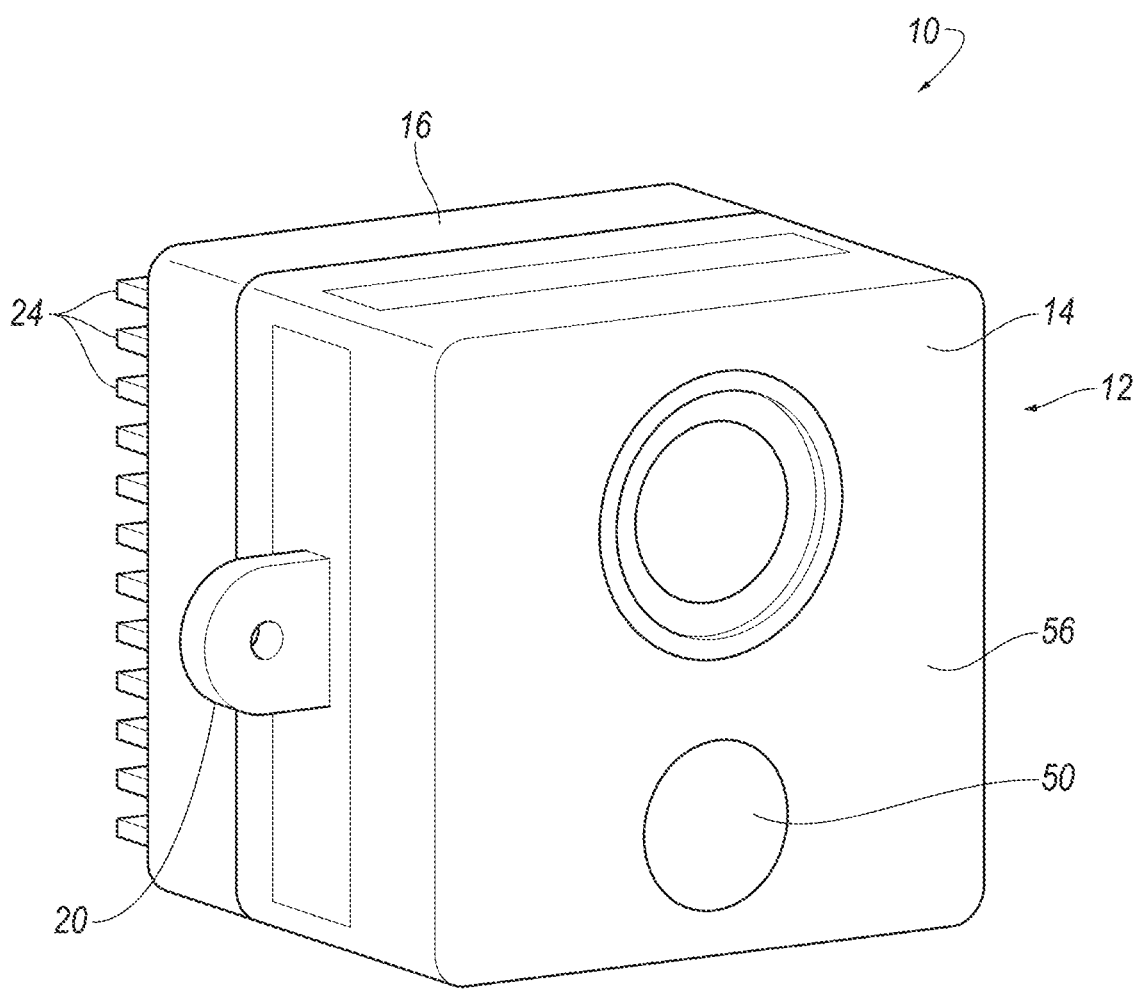
FIG. 2 is a perspective view of a vehicle lidar assembly.
Figure 3:
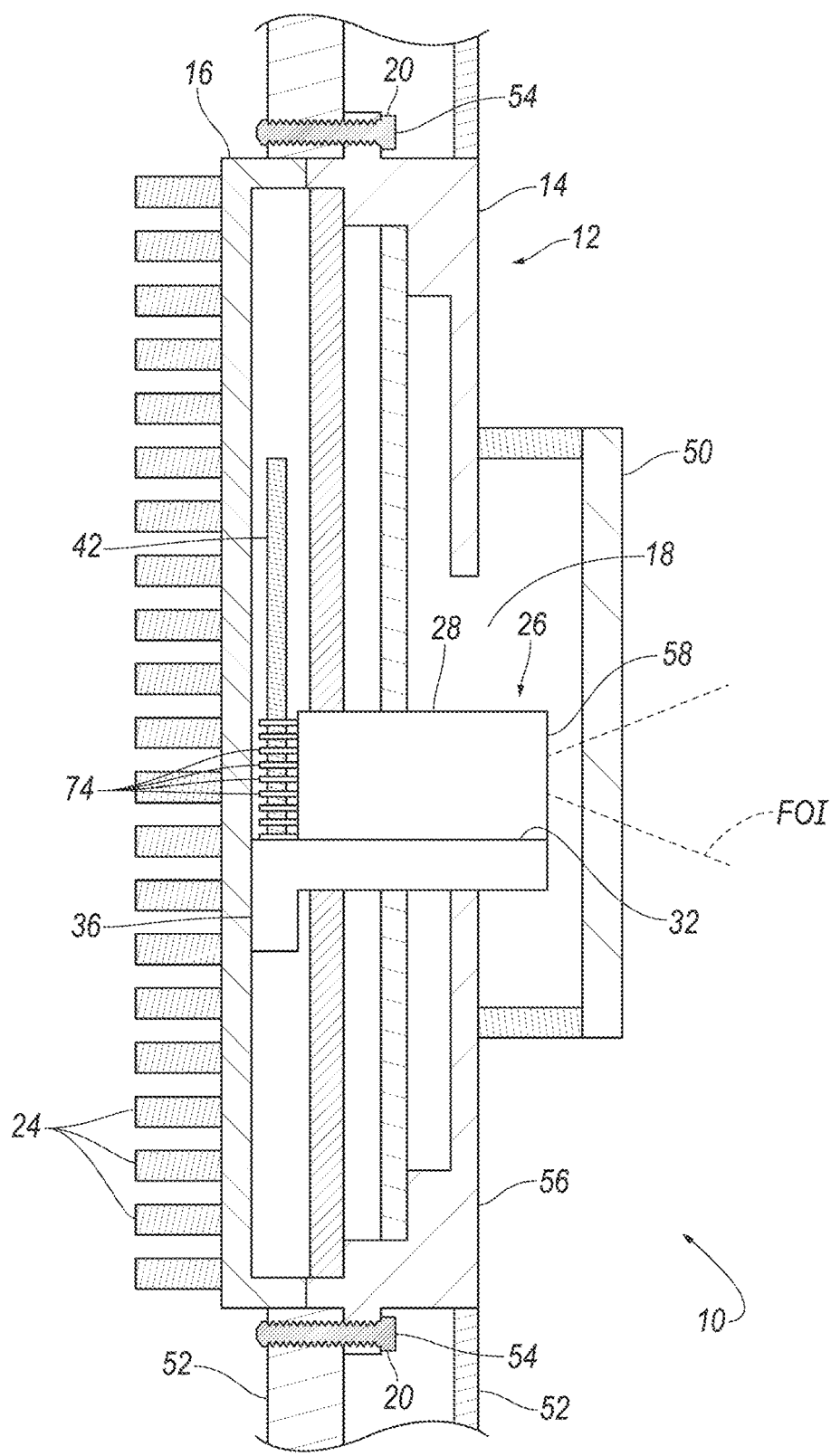
FIG. 3 is a cross-sectional view of one example of the vehicle lidar assembly.
Figure 7:
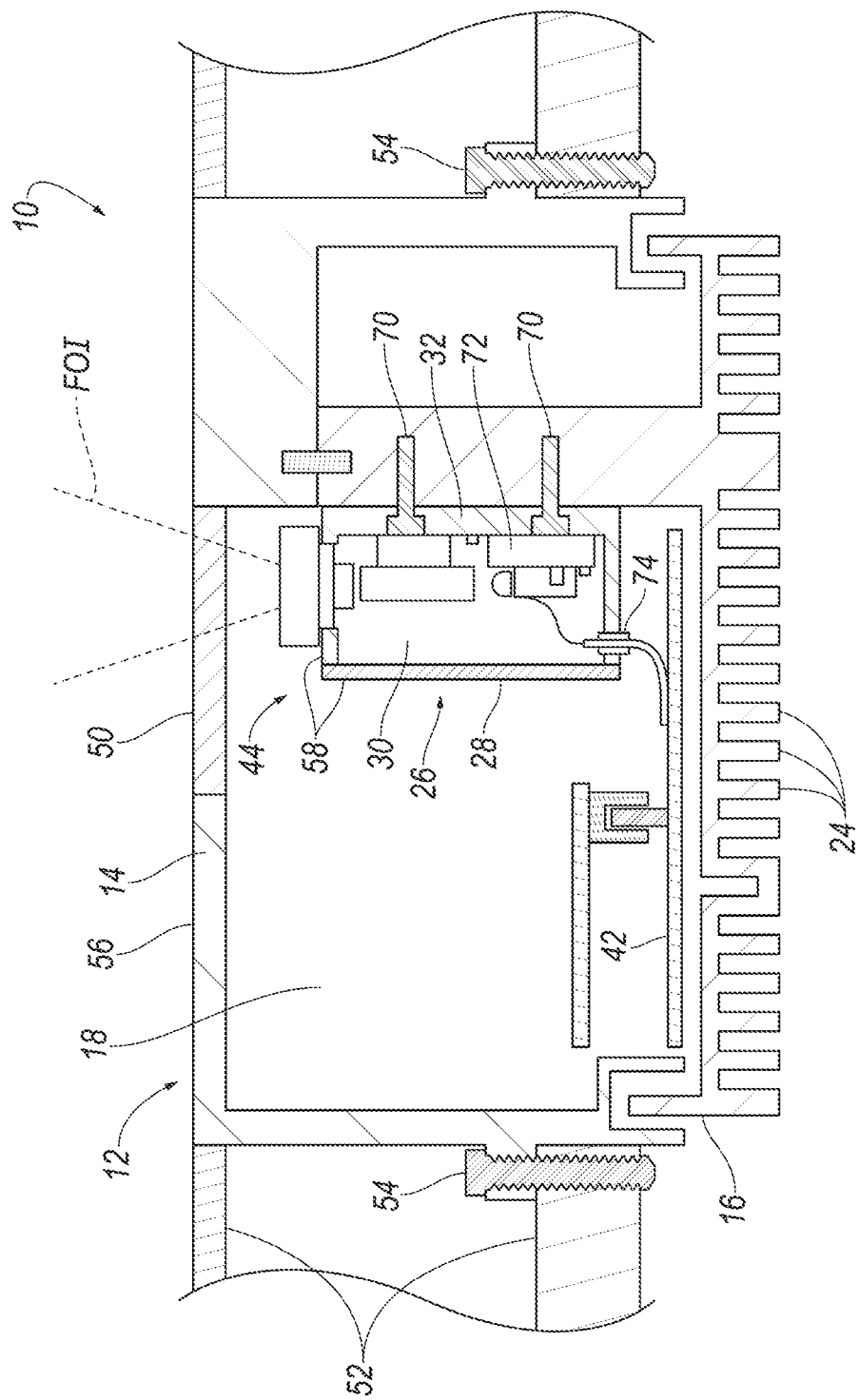
FIG. 7 is a cross-sectional view of another example of the vehicle lidar assembly.

The front cover 14 has at least one attachment feature 20 designed to directly connect to the vehicle 22. For example, as shown in FIGS. 2, 3, and 7, the attachment feature 20 may be a flange that protrudes outwardly. In the example shown in FIGS. 2, 3, and 7, the attachment feature 20 is connected to the vehicle 22, e.g., a vehicle frame, vehicle body panel 52, etc., with fasteners, e.g., threaded fasteners 54. In other examples, the attachment feature 20 may be connected to the vehicle 22 in any suitable fashion. In the example shown in FIGS. 2, 3, and 7, the front cover 14 includes two attachment features 20 by way of example. The front cover 14 may include any suitable number of attachment features 20, i.e., one or more.

The front cover 14 may have a class-A surface 56, i.e., a finished surface exposed to view by a customer and free of unaesthetic blemishes and defects. The class-A surface 56 may be exposed at an exterior of the vehicle 22, e.g., on an external vehicle body panel 52. The class-A surface 56 may face in a common direction with other class-A surfaces of the vehicle 22, e.g., external surfaces of the external vehicle body panel 52. The class-A surface 56 of the front cover 14 may be flush with the surrounding external surfaces of the vehicle 22. The outer optical fascia 50 may be at the class-A surface 56.

The back cover 16 is supported by the front cover 14. In other words, the weight of the back cover 16 is supported by the front cover 14. Specifically, the front cover 14 supports the weight of the back cover 16 at the attachment features 20 of the front cover 14.

The back cover 16 is positioned to be spaced from a vehicle 22. In other words, the back cover 16 does not contact the vehicle 22. Accordingly, heat is not conducted from the back cover 16 the vehicle 22. The back cover 16 has fins 24 designed to dissipate heat. Specifically, the fins 24 are of a size, shape, and orientation to dissipate heat from the back cover 16 to the air external to the casing 12. The back cover 16 may include electronic connections to connect to and communicate with electronic system of the vehicle 22, e.g., components of the ADAS.

The laser module 26 is disposed in the casing cavity 18. Specifically, the laser module 26 may include a housing 28 having a hermetically-sealed cavity 30. In other words, the hermetically-sealed cavity 30 is substantially airtight to prevent external contamination that would be harmful to the laser 34.

The housing 28 can include a base 32 and walls 58 fixed to the base 32. The base 32 is connected, either directly or indirectly, to the back cover 16, as described further below. One of the walls 58 supports an outer optical fascia 84 through which the field of illumination of the laser 34 extends. The outer optical fascia 84 is hermetically sealed to the wall 58. The outer optical fascia 84 is a transparent or semi-transparent material, e.g., glass, plastic, etc.

The walls 58 and the base 32 define the hermetically-sealed cavity 30. The walls 58 may be integral with the base 32. As one example of being integral, the walls 58 and the base 32 may be connected in a way that the walls 58 and the base 32 may not be separated without destruction. As examples, the walls 58 and the base 32 may be of different material types simultaneously formed to be integral or may be of different material types that are separately formed and subsequently integrally connected, e.g., by bonding, welding, adhesive 38, etc. As another example of being integral, the walls 58 and the base 32 may be unitary, i.e., formed of the same material type into a single, uniform piece of material with no seams, joints, fasteners, or adhesive 38s holding it together, e.g., by machining from a unitary blank, molding, forging, casting, etc.

The base 32 may be a copper composite. As an example, the base 32 may be copper tungsten or copper molybdenum. The walls 58 may be an iron-nickel-cobalt alloy. As an example, the walls 58 may be an alloy available under the tradename Kovar. Pins may extend through at least one of the walls 58 to provide electronic connection to connect to and communicate with electronic system of the vehicle 22, e.g., components of the ADAS, e.g., through the circuit board 42.

Figure 4:
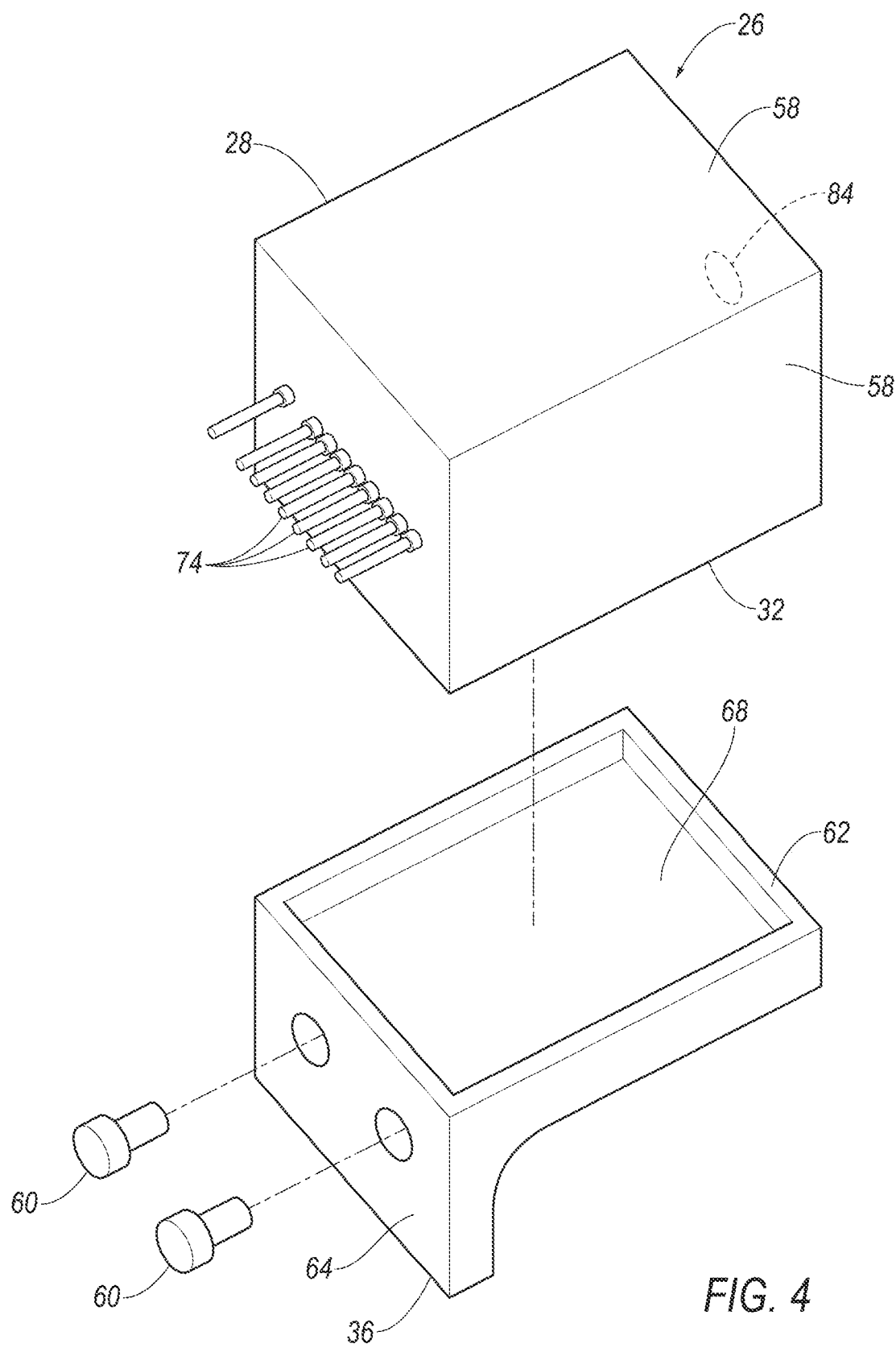
FIG. 4 is a partially-exploded view of a laser module and a bracket of the example of FIG. 3.
Figure 5:
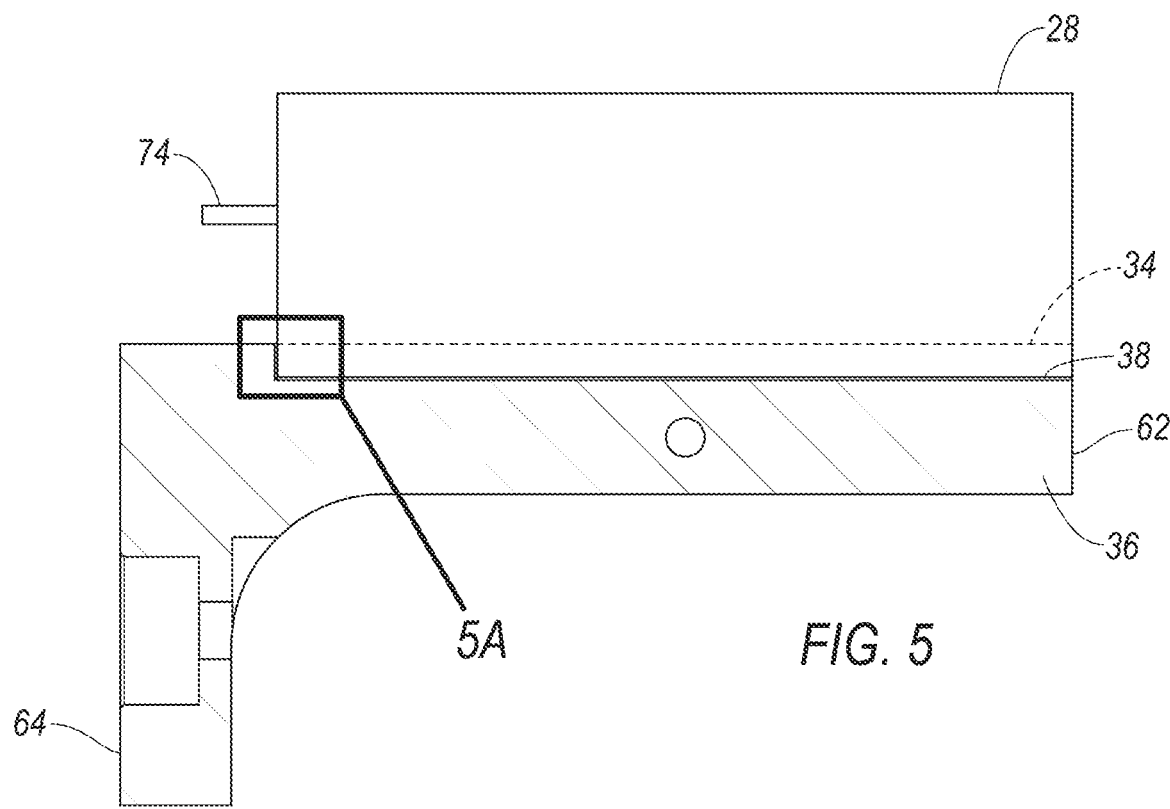
FIG. 5 is a side view of the bracket and the laser module with the bracket in cross-section.
Figure 5A:
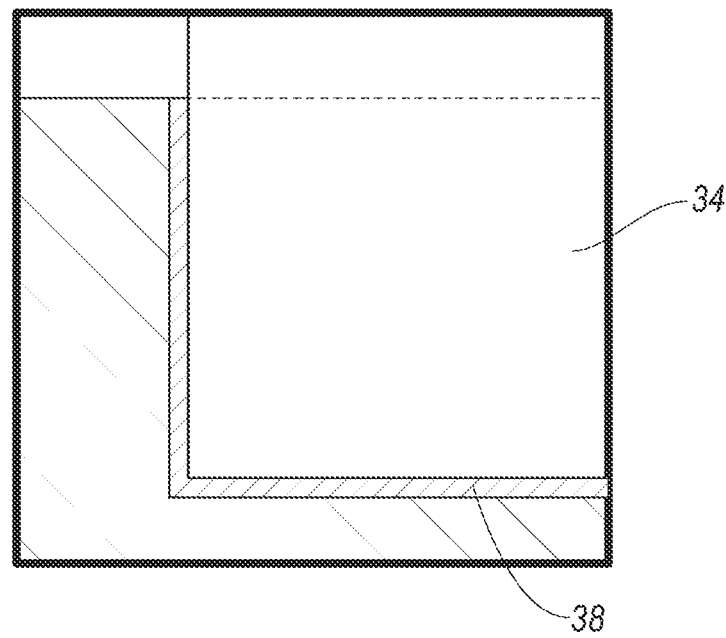
FIG. 5A is a magnified view of a portion of FIG. 5.
Figure 8:
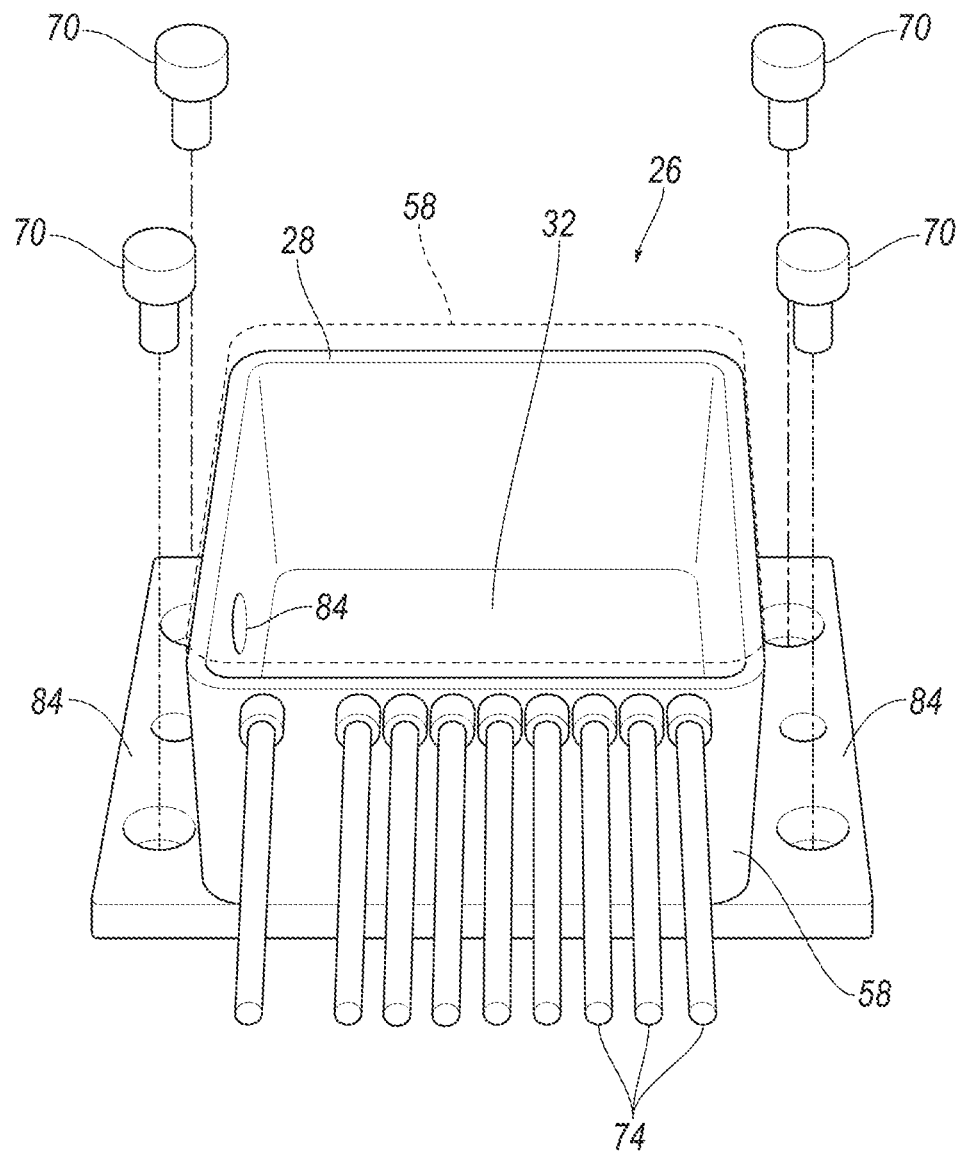
FIG. 8 is a perspective view of the laser module of FIG. 7 with one wall shown in broken lines to show a hermetically-sealed cavity (and with the internal components of the laser module not shown in the hermetically-sealed cavity).
Figure 9:
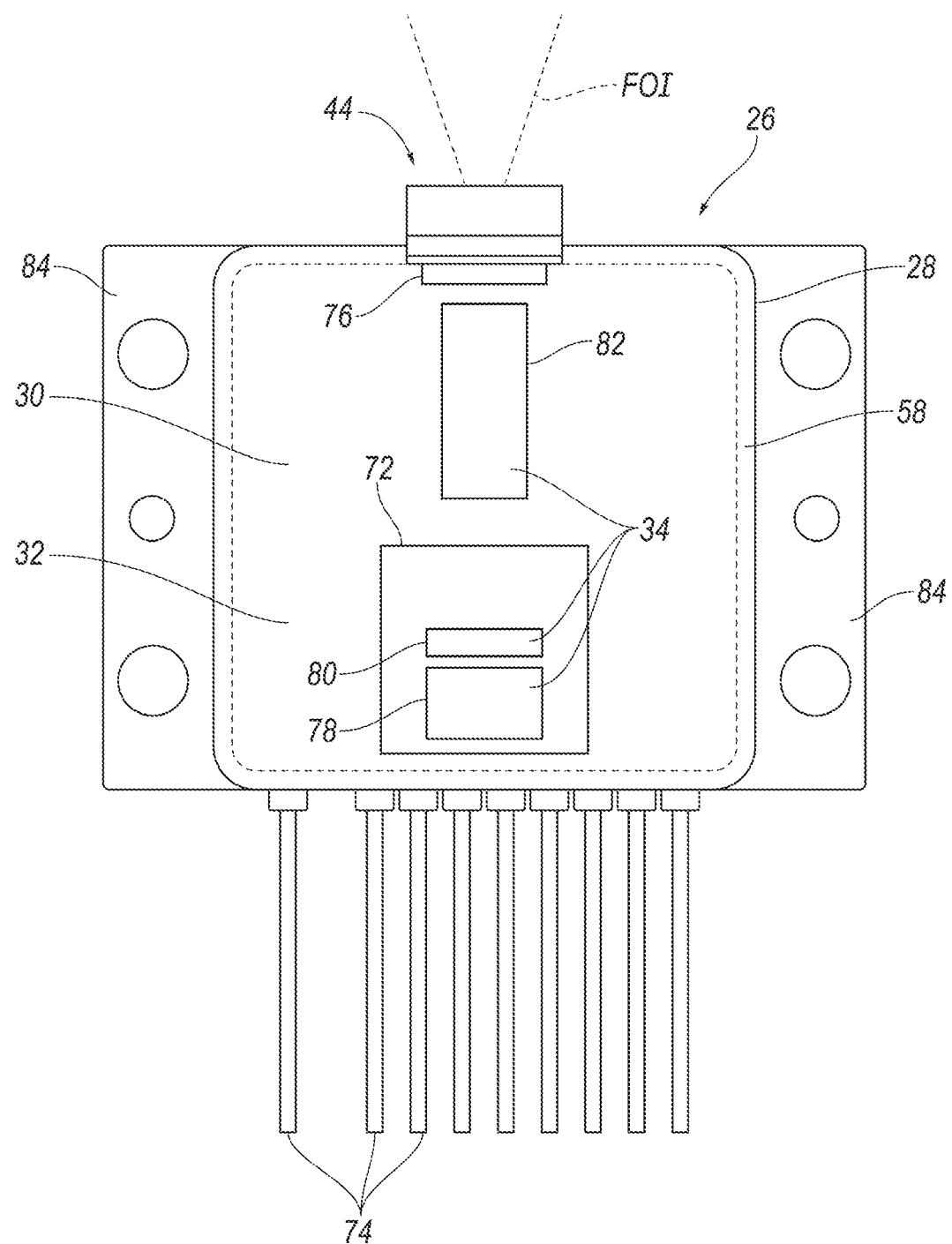
FIG. 9 is a top view of the laser module of FIG. 7 with one of the walls shown in broken lines to show the hermetically-sealed cavity and the internal components of the laser module.
Figure 10:
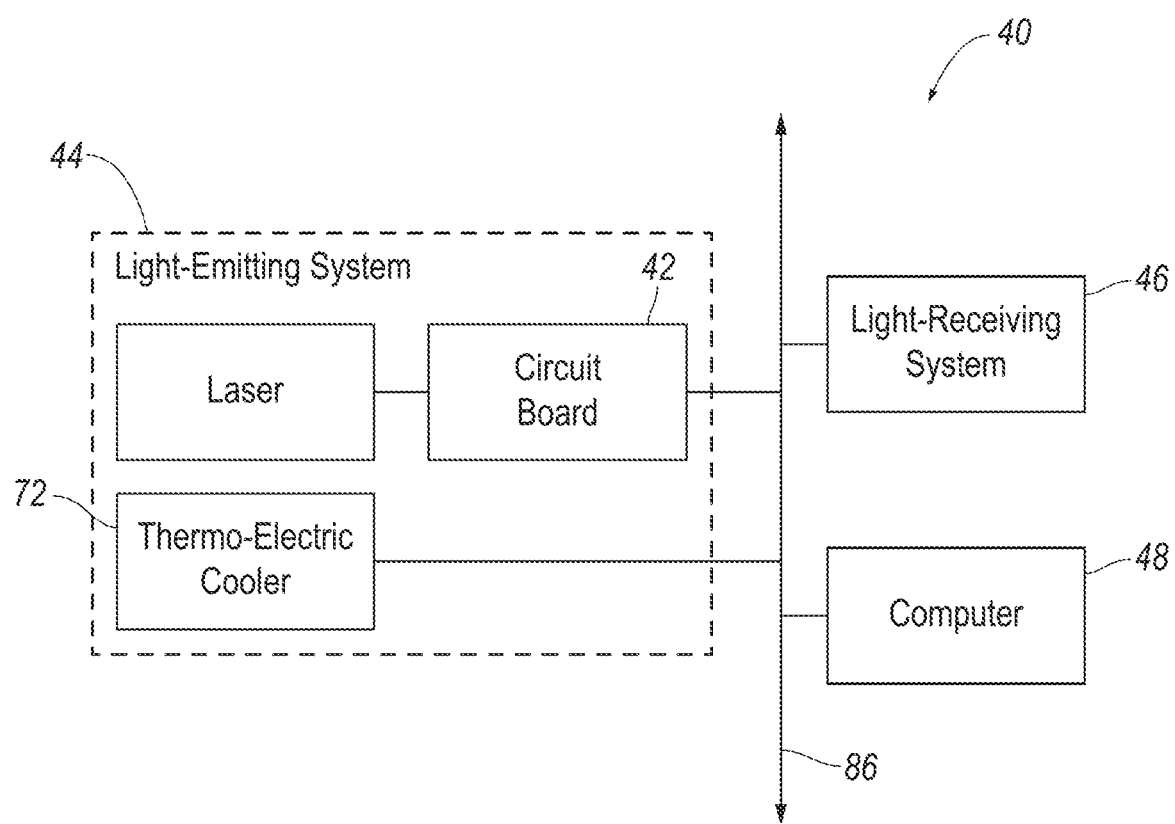
FIG. 10 is a block diagram of a lidar system of the vehicle.

As set forth above, one example of connection of the laser module 26 to the back cover 16 is shown in FIGS. 3-5 and another example of connection of the laser module 26 to the back cover 16 is shown in FIGS. 7-9. Common numerals are used to identify common features in FIGS. 3-5 and 7-9.

In the example shown in FIGS. 3-5, the assembly 10 may include the bracket 36 fastened to the back cover 16. The bracket 36 may be fastened to the back cover 16 with, for example, threaded fasteners 60. Specifically, the bracket 36 may include a platform 62 that supports the housing 28 and foot 64 that extends transverse to the platform 62. The foot 64 may include holes 66 that receive the threaded fasteners 66. The platform 62 may include a recess 68 that receives the housing 28.

In the example shown in FIGS. 3-5, the adhesive 38 directly connects the base 32 of the housing 28 to the bracket 36. In other words, the adhesive 38 directly contacts the base 32 and directly contacts the bracket 36.

As set forth above, the bracket 36 and the adhesive 38 may reduce the material of the housing 28, e.g., copper composite, needed for heat dissipation, which may increase heat dissipation and/or reduce cost associated with the material of the housing 28. The bracket 36 and the adhesive 38 may be of material types that have high thermal conductivity. For example, the bracket 36 may be aluminum and/or the adhesive 38 may be silicone. In the example shown in FIGS. 3-5, the adhesive 38 is external to the hermetically-sealed cavity 30 of the laser 34 housing 28 so that outgas from the adhesive 38, e.g., during curing of the adhesive 38, does not foul the laser 34.

In the example shown in FIGS. 7-9, the housing 28 of the laser module 26 abuts the back cover 16 to directly dissipate heat from the housing 28 to the back cover 16. In other words, the housing 28 and the back cover 16 have surface-to-surface contact. The housing 28 is directly connected to the back cover 16. Specifically, the base 32 may be directly fastened to the back cover 16 with fasteners, e.g., threaded fasteners 70. For example, the housing 28 may include feet 84 that include holes for receiving the threaded fasteners 70.

The laser 34 housing 28 houses and supports internal components of the laser module 26 including the laser 34, optics, and electronic components. Specifically, the laser 34, optics, and electronic components are in the hermetically-sealed cavity 30.

The laser 34 emits shots, i.e., pulses, of light into the field of illumination FOI for detection by the light-receiving system 46 when the light is reflected by an object in the field of view FOV to return photons to the light-receiving system 46. The light-receiving system 46 has a field of view FOV that overlaps the field of illumination FOI and receives light reflected by surfaces of objects, buildings, road, etc., in the field of view FOV. The laser 34 may be in electronic communication with the computer 48, e.g., to provide the shots in response to commands from the computer 48. Specifically, the laser 34 may be in electronic communication with the computer 48 through the circuit board 42.

The light-emitting system 44 includes optical components such as a lens package, lens crystal, pump delivery optics, etc. The optical components may be between the laser 34 and the outer optical fascia 50. Thus, light emitted from the laser 34 passes through the optical components before exiting the casing 12 through the outer optical fascia 50. The lens package may include a monolithic optical lens (e.g., glass or plastic) having a light-shaping region. In such examples, the monolithic lens may be of any suitable type that shapes light from the light emitter 30 toward the outer optical fascia 50. For example, the lens package may include a diffuser 76. The lens package may, for example, include a diffractive optical element, a diffractive diffuser, a refractive diffuser, a blazed grating, etc. The light-receiving system 46 may include receiving optics such as the lens package.

The laser 34 may be a semiconductor laser 34, e.g., laser diodes. As one example, the laser 34 may include a vertical-cavity surface-emitting laser (VCSEL) emitter. As another example, the laser 34 may include a diode-pumped solid-state laser (DPSSL) emitter. As another example, the laser 34 may include an edge emitting laser emitter. The laser 34 may be designed to emit a pulsed flash of light, e.g., a pulsed laser light. Specifically, the laser 34, e.g., the VCSEL or DPSSL or edge emitter, is designed to emit a pulsed laser light. Each pulsed flash of light may be referred to as the "shot" as used herein. The light emitted by the laser 34 may be infrared light. Alternatively, the light emitted by the laser 34 may be of any suitable wavelength. The assembly 10 may include any suitable number of lasers 34. In examples that include more than one laser 34, the lasers 34 may be identical or different.

Figure 6:
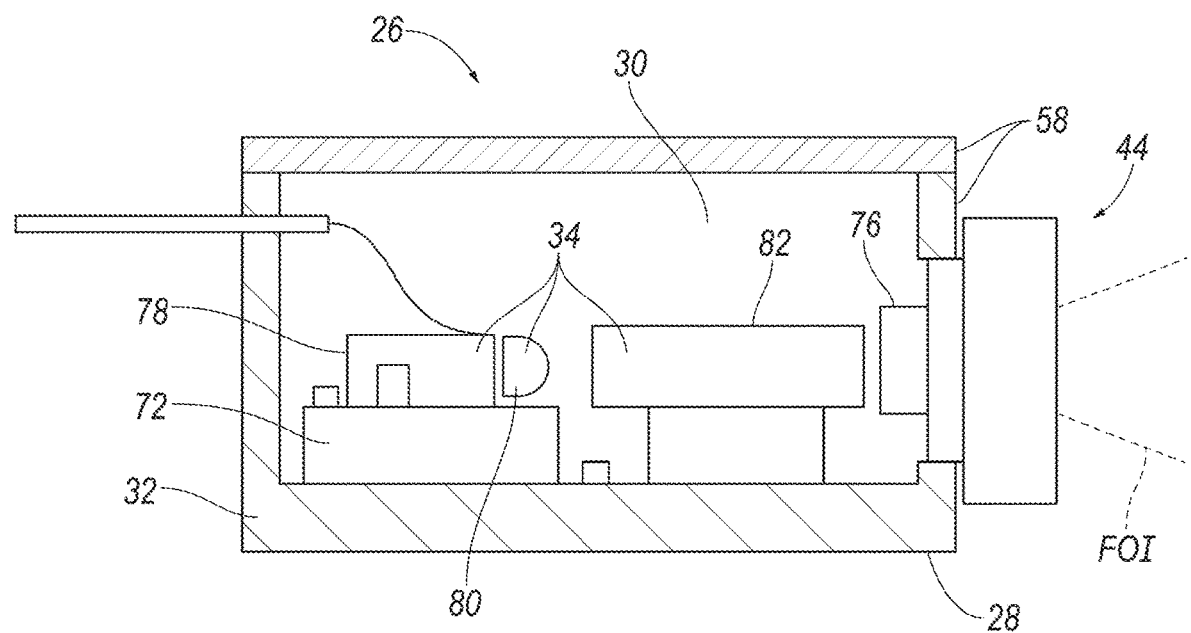
FIG. 6 is a schematic cross-section of the laser module.

With reference to FIGS. 3 and 7, the light-emitting system 44 includes the circuit board 42, e.g., a transmitter driver board, including electrical components for actuating the laser 34. The laser 34 is in electronic communication with the circuit board 42, i.e., through a wired connection. The circuit board 42 provides actuation for the laser 34 to emit light. The light-emitting system 44 may include passive components such as capacitors, resistors, etc., on the circuit board 42. The circuit board 42 is supported by back cover 16. The laser 34 may include a laser diode 78, an axial lens 80, and a laser crystal 82, as shown in FIGS. 6 and 9.

The assembly 10 may include the thermo-electric cooler (TEC) 72 for cooling the laser 34. The TEC 72 may be between the laser 34 and the base 32 of the housing 28. The TEC 72 may be in electronic communication, e.g., wired communication, with the circuit board 42 to receive instructions from the circuit board 42.

The light-receiving system 46 includes at least one light sensor. The light sensor includes the array of photodetectors, i.e., a photodetector array. The light sensor includes a chip and the array of photodetectors is on the chip. The chip may be silicon (Si), indium gallium arsenide (InGaAs), germanium (Ge), etc., as is known. The array is 2-dimensional. Specifically, the array of photodetectors includes a plurality of photodetectors arranged in a columns and rows. Each photodetector is light sensitive. Specifically, each photodetector detects photons by photo-excitation of electric carriers. An output signal from the photodetector indicates detection of light and may be proportional to the amount of detected light. The output signals of each photodetector 14 are collected to generate a scene detected by the photodetector. The photodetectors may be of any suitable type, e.g., photodiodes (i.e., a semiconductor device having a p-n junction or a p-i-n junction) including avalanche photodiodes, metal-semiconductor-metal photodetectors, phototransistors, photoconductive detectors, phototubes, photomultipliers, etc. As an example, the photodetectors may each be a silicon photomultiplier (SiPM). As another example, the photodetectors may each be or a PIN diode. Each photodetector may also be referred to as a pixel.

The light-receiving system 46 may include receiving optics. The light-receiving system 46 may include a receiving window and the receiving optics may be between the receiving window and the array of photodetectors. The receiving optics may be of any suitable type and size.

The computer 48 of the lidar system 40 is a microprocessor-based controller implemented via circuits, chips, or other electronic components. The computer 48 may be in electronic communication with the laser 34, the pixels, and the vehicle 22 (e.g., with the ADAS) to receive data and transmit commands. The computer 48 includes a processor and a memory. The memory stores instructions executable by the processor to execute the operations disclosed herein and electronically stores data and/or database 32s. The memory includes one or more forms of computer-readable media, and stores instructions executable by the computer 48 for performing various operations, including as disclosed herein. For example, the computer 48 may include a dedicated electronic circuit including an ASIC (Application Specific Integrated Circuit) that is manufactured for a particular operation, e.g., calculating a histogram of data received from the assembly 10 and/or generating a 3D environmental map for a field of view FOV (FOV) of the vehicle 22. In another example, the computer 48 may include an FPGA (Field Programmable Gate Array) which is an integrated circuit manufactured to be configurable by a customer. As an example, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, and logical components inside an FPGA may be configured base 32d on VHDL programming, e.g. stored in a memory electrically connected to the FPGA circuit. In some examples, a combination of processor(s), ASIC(s), and/or FPGA circuits may be included inside a chip packaging. The computer 48 may be a set of computers communicating with one another via the communication network of the vehicle 22, e.g., a computer 48 of the lidar system 40 and a second computer in another location in the vehicle 22.

The computer 48 may operate the vehicle 22 in an autonomous, a semi-autonomous mode, or a non-autonomous (or manual) mode. For purposes of this disclosure, an autonomous mode is defined as one in which each of vehicle propulsion, braking, and steering are controlled by the computer 48; in a semi-autonomous mode the computer 48 controls one or two of vehicle propulsion, braking, and steering; in a non-autonomous mode a human operator controls each of vehicle propulsion, braking, and steering.

The computer 48 may include programming to operate one or more of vehicle brakes, propulsion (e.g., control of acceleration in the vehicle 22 by controlling one or more of an internal combustion engine, electric motor, hybrid engine, etc.), steering, climate control, interior and/or exterior lights, etc., as well as to determine whether and when the computer 48, as opposed to a human operator, is to control such operations. Additionally, the computer 48 may be programmed to determine whether and when a human operator is to control such operations.

The computer 48 may include or be communicatively coupled by a communication network 86, e.g., via a vehicle communication bus, to more than one processor, e.g., controllers or the like included in the vehicle 22 for monitoring and/or controlling various vehicle controllers, e.g., a powertrain controller, a brake controller, a steering controller, etc. The computer 48 is generally arranged for communications on a vehicle communication network that can include a bus in the vehicle 22 such as a controller area network (CAN) or the like, and/or other wired and/or wireless mechanisms.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A vehicle lidar assembly comprising:
    a casing having a front cover and a back cover connected to the front cover defining a casing cavity between the front cover and the back cover;
    the front cover having an attachment feature designed to directly connect to a vehicle;
    the back cover being supported by the front cover and having fins designed to dissipate heat;
    a laser module disposed in the casing cavity;
    the laser module including a housing having a hermetically-sealed cavity, the housing including a base that is connected to the back cover; and
    the laser module including a laser disposed in the hermetically-sealed cavity and supported by the base;
    the housing includes walls integral with the base, the base and the walls defining the casing cavity, and the walls being an iron-nickel-cobalt alloy;
    a thermo-electric cooler between the laser and the base of the housing; and
    a bracket and a silicon adhesive, external to the hermetically-sealed cavity, and connecting the base of the housing to the bracket, the bracket being aluminum, and the base of the housing being a copper composite.

2. The vehicle lidar assembly as set forth in claim 1, further comprising a diffuser supported by the housing in the field of illumination of the laser.

3. The vehicle lidar assembly as set forth in claim 1, wherein the base of the housing abuts the back cover and is directly fastened to the back cover with fasteners, the base of the back cover being a copper-composite.

4. The vehicle lidar assembly as set forth in claim 1, wherein the base abuts the back cover.

5. The vehicle lidar assembly as set forth in claim 1, wherein the back cover is directly connected to the front cover.

6. The vehicle lidar assembly as set forth in claim 1, wherein the front cover has a class-A surface, and further comprising an outer optical fascia at the class-A surface, the outer optical fascia being in the field of illumination of the laser.

7. The vehicle lidar assembly as set forth in claim 6, wherein the front cover conceals the back cover when connected to a vehicle.

8. The vehicle lidar assembly as set forth in claim 1, wherein the back cover is positioned to be spaced from a vehicle to which the front cover is connected.

9. The vehicle lidar assembly as set forth in claim 1, further comprising a circuit board supported by back cover, the laser being in electronic communication with the circuit board.

* * * * *